United States Patent [19]

Colyn

[11] 3,863,126

[45] Jan. 28, 1975

[54] DEVICE FOR CHARGING AT A PREDETERMINED VOLTAGE, AN ELEMENT FOR STORING ELECTRICAL POWER

[75] Inventor: Roland Colyn, Le Perreux, France

[73] Assignee: Compagnie Generale D'Electricite, Paris, France

[22] Filed: Nov. 2, 1973

[21] Appl. No.: 412,519

[30] Foreign Application Priority Data
Nov. 3, 1972 France .............................. 72.38944

[52] U.S. Cl. ............................ 320/1, 321/16, 323/9
[51] Int. Cl. ......................... G05f 1/46, H02m 3/22
[58] Field of Search .................. 320/1; 340/173 CA; 307/110; 321/16; 323/9

[56] References Cited
UNITED STATES PATENTS
3,417,306   12/1968   Knak ........................................ 320/1
3,721,885    3/1973   McKeown .............................. 320/1

Primary Examiner—Stuart N. Hecker
Attorney, Agent, or Firm—Sughrue, Rothwell, Mion, Zinn & Macpeak

[57] ABSTRACT

Device for charging, at a predetermined voltage, an element for storing electrical power comprising an induction coil fed by an electric power source through a transistor and means for controlling the blocking of the transistor when the charge current of the coil exceeds a first threshold. This device comprises, moreover, extra means for controlling the blocking of the transistor when the charge current for the coil exceeds a second threshold, this means acting when the charge voltage of the storage cell exceeds a predetermined voltage.

1 Claim, 1 Drawing Figure

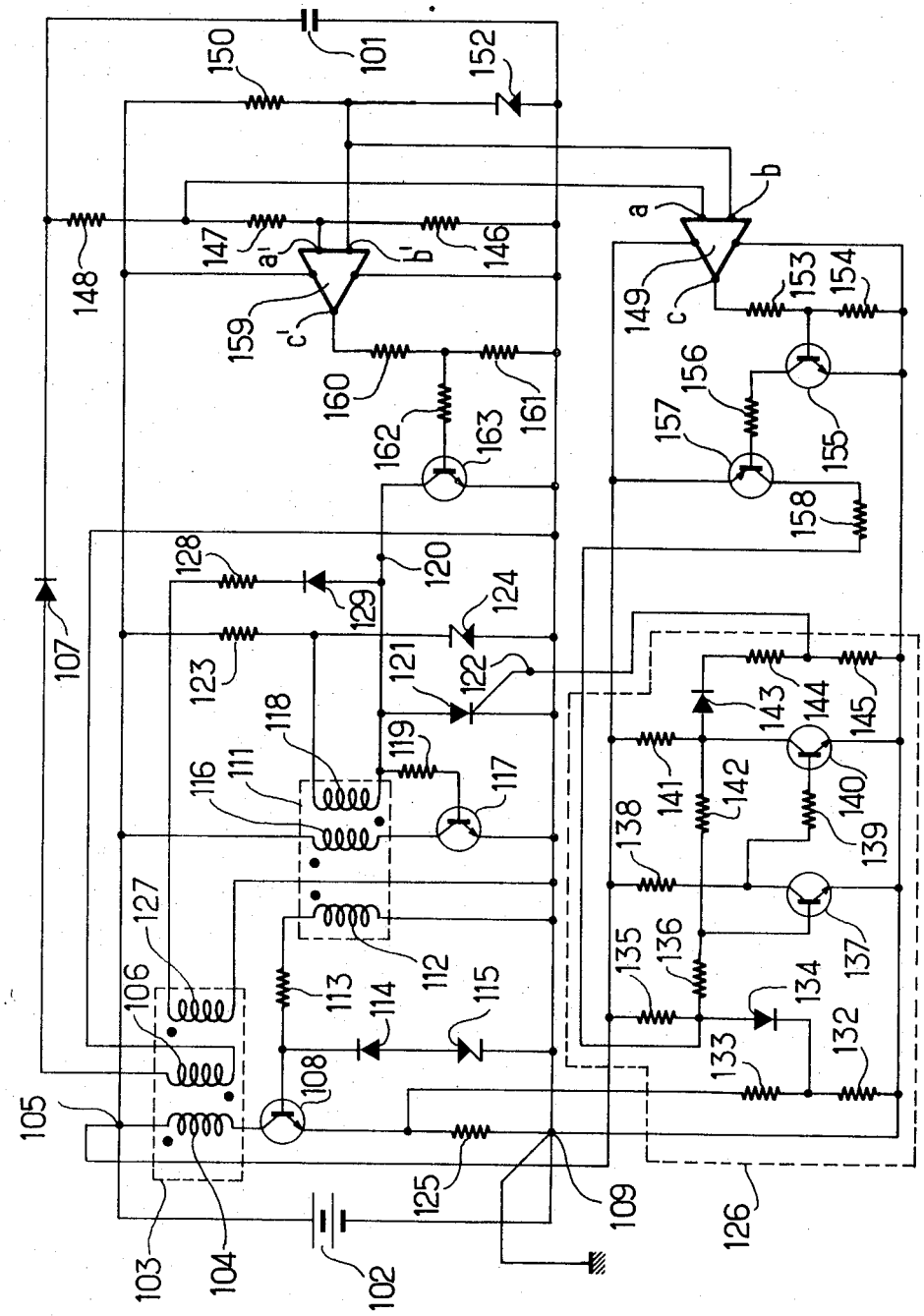

DEVICE FOR CHARGING AT A PREDETERMINED VOLTAGE, AN ELEMENT FOR STORING ELECTRICAL POWER

BACKGROUND OF THE INVENTION

The present invention concerns an device for charging, at a predetermined voltage, an element for storing electrical energy.

DESCRIPTION OF THE PRIOR ARTS

There is known a device for charging at a predetermined voltage, an element for storing electrical energy, that device comprising:

an electrical direct current source, an induction coil comprising a primary winding whose ends are connected respectively to the terminals of the said source to provide a current for charging that coil and a secondary winding whose ends are connected respectively to the terminals of the said storing element, a circuit breaker in series with the said primary winding, means for controlling the said circuit breaker, adapted to cause, by the opening of that circuit breaker, discharge, in the said storing element, of the charging energy of the said coil, a rectifier in series with the said secondary winding, means sensitive to the charge voltage of the said storing element for interrupting the charging of that said storing element when that voltage reaches the said predetermined voltage, characterized in that it comprises:

first means sensitive to the charge current of the said coil for controlling the opening of the said circuit breaker when the intensity of that current reaches a predetermined threshold, and second means sensitive to the discharge current of the said coil in the said storing element for maintaining the said circuit breaker open for the whole duration of that discharge, the said means for controlling the said circuit breaker being adapted for maintaining it closed when the said first and second opening means are inoperative.

In prior art device as described above, the circuit-breaker may be constituted by a transistor connected with its main electrodes in series with the primary winding of the coil, the means for controlling that circuit-breaker then being constituted by a control circuit suitable for biasing the control electrode of that transistor. In that case, the first means sensitive to the charging current of the coil for controlling the opening of the switch comprises a resistor in series in the charging circuit of the coil and a threshold circuit whose input is connected to the terminals of that resistor and whose output is connected to an input of the control circuit.

The operation of the above described prior art device comprises a series of cyclic discharges of the coil in the storing element, these discharges causing an increase, in successive stages, of the voltage at the terminals of the storing element.

The above described prior art device has certain disadvantages. Indeed the choice of the predetermined threshold causes difficult problems.

If that threshold is selected at a relatively high level, the difference between the values of the successive stages of the voltage of the storing element are of relatively great amplitude. As a discharge of the coil cannot be interrupted when it has been primed, the final charging voltage of the storing element may be greater than the predetermined voltage and the error on that charging voltage is, in general, high, since the amplitude of the differences between stages is high.

To obtain a good precision on the value of the final charging voltage, circumstances therefore lead to the fixing of that threshold at a relatively low level, so that an increase in the voltage at the terminals of the storing element from one stage to the following stage is less than the error tolerated on the voltage. The frequency of the cyclic discharges is, in that case, relatively high. The result thereof is hence a reduction in the efficiency of the device and an increase in the total charging time for the storing element.

SUMMARY OF THE INVENTION

The aim of the present invention is to overcome these disadvantages and to produce a device having good efficiency and suitable for charging rapidly, at a predetermined voltage, with good precision, an element for storing electric energy.

The present invention has for its object a device for charging, at a perdetermined voltage, an element for storing electric energy, that device comprising:

an electrical direct current source, an induction coil comprising a primary winding whose ends are connected respectively to the terminals of the said source to provide a current for charging that coil and a secondary winding whose end are connected respectively to the terminals of the said storing element.

a transistor comprising two main electrodes and an auxiliary electrode for the controlling thereof, that transistor being connected by its main electrodes in series with the said primary winding in the charging circuit of the said coil, a control circuit suitable for biasing the auxiliary electrode of the said transistor.

a rectifier connected in series between the said secondary winding and said storing element, a circuit-breaker sensitive to the charging voltage of the said storing element for stopping the charging of that storing element when that voltage reaches the said predetermined voltage, affecting the said control circuit to block the said transistor, first means sensitive to the charge current of the said coil for controlling the blocking of the said transistor when the intensity of the current exceeds a predetermined threshold, this first means comprising, a resistor in series with the charging circuit of the said coil, a threshold circuit adapted for comparing the voltage at the terminals of the said resistor at a reference voltage, the output of that threshold circuit being connected up to a first input of the said control circuit, second means sensitive to the discharge current of the coil in the said storing element for maintaining the blocking of the said transistor for the whole duration of that discharge, this second means comprising a third winding magnetically coupled to the primary and secondary windings of the coil, that third winding being connected to a second input of the said control circuit, the said control circuit being adpated for controlling the conducting of the said transistor when the said first and second means are inoperative, characterised in that it comprises, moreover, extra means sensitive to the charging voltage of the said storing element and connected to the said threshold circuit for controlling the blocking of the said transistor when the intensity of the charging current exceeds a second predetermined threshold lower than the said first threshold, this extra means acting when the charging voltage of the storing element exceeds another predetermined voltage lower than the said predetermined voltage.

BRIEF DESCRIPTION OF THE DRAWING

The present invention will be more easily understood from the following description given with reference to the accompanying drawing by way of illustration but having no limited character, in which the single FIGURE shows a diagram of an embodiment of the device according to the invention.

DESCRIPTION OF THE PREFERRED EMBODIMENT

The said FIGURE shows a device for charging, at a predetermined voltage, an element for storing electric energy, for example a capacitor 101.

That device comprises an electrical direct current source 102 and a coil 103 whose primary winding 104 is connected to the terminals of that source in series with the main circuit of transistor 108, for example of npn type. As shown in the figure, one end of the winding 104 is connected to a positive polarity terminal 105 of the source 102, the other end of that winding being connected to the collector of the transistor 108, the emitter of that transistor being connected to a terminal 109 of the source 102 by means of resistor 125, that terminal 109 being at zero potential and connected to ground of the device. The coil 103 comprises a secondary winding 106 whose ends are connected to the terminals of the capacitor 101 through a rectifier 107.

The device comprises also a control circuit adapted to bias the base of the transistor 108. That control circuit comprises, for example, a coil 111 comprising a secondary winding 112 whose ends are connected respectively on the one hand through a resistor 113 to the base of the transistor 108 and on the other hand to the terminal 109.

A branch comprising, in series insert oppositely poled, a diode 114 and a Zener diode 115, the cathode of the Zener diode 115 being connected up to the terminal 109 is arranged between the base of the transistor 108 and the terminal 109. The coil 111 comprises, furthermore, a winding 116 one of whose ends is connected to the terminal 105 and whose other end is connected to the collector of a transistor 117 of npn type whose emitter is connected to the terminal 109. The coil 111 comprises, finally, a winding 118 one of whose ends is connected on the one hand through a resistor 119 to the base of the transistor 117 and, on the other hand, to an input terminal 120 of the control circuit. The other end of the winding 118 is connected on the one hand to a terminal of a resistor 123 whose other terminal is connected to the terminal 105 and on the other hand to the cathode of a Zener diode 124 whose anode is connected to the terminal 109. A branch comprising, successively, in series, a diode 129 whose anode is connected to the terminal 120, a resistor 128 and a third winding 127 of the coil 103, is arranged between the terminal 120 and the terminal 109. Lastly, the anode of a thyristor 121 is connected to the terminal 120, the cathode of that thyristor being connected to the terminal 109 and the auxiliary electrode of that thyristor being connected to another input terminal 122 of the control circuit.

The device illustrated by the figure comprises means for controlling the blocking of the transistor 108 when the intensity of the charging current of the coil 103 exceeds a first predetermined threshold. This blocking means comprises on the one hand the resistor 125 connected in series in the charging circuit of the coil 103 for example between the emitter of the transistor 108 and the terminal 109 on the one hand and on the other hand by a threshold circuit 126 whose input is connected to the terminals of the resistor 125 and whose output is connected to the terminal 122 of the control circuit.

That threshold circuit may comprise a branch whose ends are connected to the terminals of the resistor 125, that branch being composed of two resistors 132 and 133 connected in series, a terminal of the resistor 132 being connected to the terminal 109. The common junction between the resistors 132 and 133 is connected to the cathode of a diode 134 whose anode is connected to the terminal 105 through a resistor 135. The anode of the diode 134 is also connected, through a resistor 136, to the base of a transistor 137 of npn type. The emitter of the transistor 137 is connected to the terminal 109 whereas its collector is connected to the terminal 105 through a resistor 138. The collector of the transistor 137 is also connected through a resistor 139 to the base of an npn transistor 140 whose emitter is connected to the terminal 109 and whose collector is connected on the one hand to the terminal 105 through a resistor 141 and on the other hand to the base of the transistor 137 through resistor 142. The collector of the transistor 140 is also connected to the anode of a diode 143 whose cathode is connected to a terminal of a resistor 144, the other terminal of the resistor 144 being connected to a terminal of a resistor 145 whose other terminal is connected to the terminal 109. The common junction between the resistors 144 and 145 is connected to the terminal 122 of the control circuit.

That device comprises means for controlling the blocking of the transistor 108 when the intensity of the charging current of the coil 103 reaches a second predetermined threshold lower than the first threshold, this means acting when the charging voltage of the capacitor 101 exceeds another predetermined voltage, lower than the predetermined voltage at which it is proposed that the capacitor 101 be charged. This means comprises a branch whose ends are connected to the terminals of the capacitor 101, that branch comprising three resistors 146, 147 and 148 connected successively in series, an end of the resistor 146 being connected to the terminal 109. The common junction between the resistors 147 and 148 is connected to an input terminal a of an amplifier 149. This means comprises also a branch whose ends are connected to the terminals of the source 102, that branch comprising, in series, successively, a resistor 150 and a Zener diode 152, the enode of the Zener diode connected to the terminal 109. The common junction between the resistors 150 and the Zener diode 152 is connected to another input terminal *b* of the amplifier 149.

The amplifier 149 is fed by the source 102: it comprises an output terminal *c* connected to a terminal of a resistor 153, the other terminal of the resistor 153 being connected to a terminal of a resistor 154 whose other terminal is connected to the terminal 109. The common junction between the resistors 153 and 154 is connected the to base of an *npn* transistor 155 whose emitter is connected to the terminal 109 and whose collector is connected through a resistor 156 to the base of an *npn* type transistor 157. The emitter of the transistor 157 is connected to the terminal 105 and its collector is connected through a resistor 158 to the anode of the diode 134 forming a part of the threshold circuit 126.

The device comprises, lastly, means for stopping the charging of the capacitor 101 when the voltage at the terminals of that capacitor reaches a predetermined value. This means comprises an amplifier 159 fed by source 102, an input terminal *a'* of that amplifier being connected to the junction conductor between the resistors 146 and 147, the other input terminal *b'* of that amplifier being connected to the link conductor between the resistor 150 and the Zener diode 152. The output terminal *c'* of the amplifier 159 is connected to a terminal of a resistor 160. The other terminal of the resistor 160 is connected to a terminal fo a resistor 161 whose other terminal is connected to the terminal 109. The junction between the resistors 160 and 161 is connected through a resistor 162 to the base of an npn transistor 163 whose emitter is connected to the terminal 109 and whose collector is connected to the terminal 120 of the control circuit.

The operation of the device shown in the figure is as follows:

At the outset, the voltage at the terminals of the capacitors 101 is zero. At the instant when the device is energised by the voltage from the source 102, the terminals *b* and *b'* of the respective amplifiers 149 and 159 are brought to the same positive potential since these terminals are connected to the same point of a branch of resistors connected to the terminals of the source 102. On the other hand, the terminals *a* and *a'* of the respective amplifiers 149 and 159 are at zero potential since they are each connected to a resistor branch connected to the terminals of the capacitor 101. Now, the amplifier 149 sends out at its output *c* a virtually zero potential when the potential of its terminal *a* is lower than that of its terminal *b*, the voltage at *c* rising suddenly when the potential of the terminal *a* reaches that of the terminal *b*. The operation of the amplifier 159 is absolutely similar to that of the amplifier 149. The potential of the terminals *c* and *c'* is therefore substantially equal to zero. This causes the blocking on the one hand of the transistors 155 and 157 and on the other hand of the transistor 163. The current is therefore zero in the resistor 125, hence the voltage at the terminals of the resistor 132 is zero. The branch comprising the diode 134 and the resistor 135 is subjected to the total voltage of the source 102: the voltage drop at the terminals of the resistor 135 is high enough for the current which passes in the main circuit of the transistor 137, limited by the resistor 136, to be insufficient to unblock that transistor 137. The current which passes in the resistor 138 being zero, the collector of that transistor is fed by the source 102 through the resistor 138. The transistor 140 is unblocked and its collector is virtually at zero potential. The terminal 122 is at zero potential due to the existence of the diode 143. The thyristor 121 is therefore also blocked.

Under these conditions, the base of the transistor 117 is biased through the resistor 123, the winding 118 and the resistor 119 at a voltage such that it becomes conductive, this causing the unblocking of the transistor 108. A charging current for the coil 103 flows in the resistor 125, and the voltage at the terminals of that resistor increases. A dot has been marked on the figure at one and of each winding of the coils 103 and 111 to indicate the positive pole of the electromotive force induced in these windings when, respectively the transistors 108 and 117 are conducting. The increases in voltage at the terminals of the resistor 125 causes a proportional voltage drop at the terminals of the resistor 132 of the threshold circuit 126. The voltage decreases at the terminals of the branch comprising the diode 134 and the resistor 135. Hence, the voltage drop at the terminals of the resistor 135 decreases. The threshold circuit 126 makes it possible to compare the difference in potential at the terminals of the resistor 125 with a reference voltage which is constituted by the critical switching voltage of the circuit comprising the transistor 137 and 140, connected up to the terminals of the resistor 135. Indeed, when the current in the resistor 125 reaches a first predetermined threshold, the difference in potential at the terminals of the resistor 135 is low enough for the source 102 to bias, through that resistor 135 and the resistor 136, the base of the transistor 137 at a voltage which is sufficient for unblocking that transistor. The result of this is the blocking of the transistor 140. The current which flows in the resistor 142 towards the base of the transistor 137 tends to reinforce the unblocking of the transistor 137 and the blocking of the transistor 140. A current flows in the resistors 144, 145 and in the diode 143. The voltage drop at the junction of the resistors 144 is then sufficient for the auxiliary electrode of the thyristor 127 to be biased positively in relation to its cathode. That thyristor 121 then becomes unblocked, thus causing the blocking of the transistors 117 and 108. The current in the resistor 125 drops suddenly to zero. The energy accumulated in the winding 106 of the coil 103 discharged into the capacitor 101; Due to the existence of the winding 127 of the coil 103, the transistor 108 cannot then be unblocked before all the energy accumulated in the coil 103 has flowed out into the capacitor 101. When that operation is ended, the transistor 108 is again unblocked and the cycle begins again. The capacitor 101, which is charged at that instant at a voltage $V_1$, is hence charged in successive stages, receiving at each cycle a same quantity of energy $E_1$ which depends on the first predetermined threshold $I_1$ of the current intensity flowing through the resistor 125, according to the equation:

$$E_1 = 1/2 \, L \, I_1^2$$

L being the self-induction coefficient of the winding 104 of the coil 103.

When the voltage at the terminals of the capacitor 101 reaches a predetermined value V*o* lower than the predetermined voltage V at which that capacitor is required to be charged, the potential of the terminal *a* of the amplifier 149 is equal to the potential of the terminal *b* of that amplifier. The voltage at the output terminal *c* of the amplifier 149 rises suddenly. A current flows in the branch composed of the resistors 153 and 154 and the transistor 155 is unblocked. The result of this is the unblocking of the transistor 157 which causes the connecting in parallel of the resistor 158 with the resistor 135 of the threshold circuit 126.

As has been seen above, the switching of the threshold circuit 126 is effected for a predetermined value of the voltage at the terminals of the resistor 135. As soon as the resistor 158 is in parallel on the resistor 135, the current which flows out at the instant of the switching in the diode 134 increases. The voltage drop at the terminals of that diode 134 increases also. As the sum of the voltages at the terminals respectively of the resistor 135, of the diode 134 and of the resistor 132 must be equal to a constant value equal to the voltage at the terminals of the source 102, the result of this is that at the instant of the switching the voltages at the terminals respectively of the resistors 132 and 125 must be lower. As soon as the resistors 158 and 135 are in parallel, the threshold device 126 switches, therefore, for a second predetermined threshold $I_2$ of the current in the resistor 125, that second threshold being less than the first threshold. The operation of the device comprises, then, a series of cycles during which the capacitor 101 becomes charged in successive voltage stages, receiving at each cycle, a quantity of energy:

$$E_2 = 1/2 \, L \, I_2^{\,2} \text{ that quantity } E_2 \text{ being lower than } E_1 \text{ since } I_2 \text{ is lower than } I_1.$$

When the voltage at the terminals of the capacitor 101 reaches the predetermined value V, the potential of the terminal *a'* of the amplifier 159 is equal to that of the terminal *b'* of that amplifier. The potential of the output terminal *c'* of the amplifier 159 then increases suddenly. A current flows in the resistors 160 and 161 and the transistor 163 is unblocked. The result of this is, then, the blocking of the transistor 117 and consequently that of the transistor 108. The energy accumulated in the coil 103 during the last operation cycle flows out through the rectifier 107 into the capacitor 101. The voltage at the terminals of the capacitor 101 is hence finally slightly above the predetermined value V. That extra charge reinforces the unblocking of the transistor 163 and assures the stopping of the charging of the capacitor 101.

As has been seen in the description of the device illustrated by the figure, the last part of the charging of the capacitor 101 which begins at the instant when the resistor 158 is connected in parallel to the resistor 135, corresponds to successive discharges in the capacitor 101 of a quantity of energy $E_2$ less than the quantity of energy $E_1$ of the discharges of the first part of the charging of the capacitor. In the second part, the frequency of the discharges is higher and the successive voltage stages are closer together. The gap between two successive voltage stages at the instant of the end of the charging of the capacitor 101 may selected to be sufficiently slight to be less than the permissible tolerance on the charging voltage for the capacitor. It is sufficient, for that purpose, to select the second predetermined threshold at a sufficiently low value. The final charging voltage for the capacitor 101 may therefore be obtained with good precision.

In the second part of the charging of the capacitor 101, the successive high-frequency discharges are effected with a lower efficiency and at the cost of an increase in the charging time of the capacitor. However, it is quite evident that the duration of that second part may be selected low in relation to the whole duration of the charging of the capacitor. Under these conditions, the overall efficiency of the charging remains, on an average, very good and the whole duration of the charging is low.

The device according to the invention may be applied to the charging of capacitors for the storing of electrical energy for laser generators.

I claim:

1. A device for charging, at a predetermined voltage, an element for storing electrical energy, comprising:
  a. an electrical direct current source,
  b. an induction coil comprising a primary winding whose end are connected respectively to the terminals of the said source to provide a current for charging that coil and a secondary winding whose ends are connected respectively to the terminals of the said storing element,
  c. a transistor comprising two main electrodes and an auxiliary electrode for the controlling thereof, that transistor being connected by its main electrodes in series with the said primary winding in the charging circuit of the said coil;
  d. a control circuit suitable for biasing the auxiliary electrode of the said transistor;
  e. a rectifier connected in series between the said secondary winding and the said storing element;
  f. a circuit-breaker sensitive to the charging voltage of the said storing element for stopping the charging of that storing element when that voltage reaches the said predetermined voltage, affecting the said control circuit to block the said transistor;
  g. first means sensitive to the charging current of the said coil for controlling the blocking of the said circuit-breaker when the intensity of that current exceeds a first predetermined threshold, said first means comprising:
    1. a resistor in series with the charging circuit of the said coil,
    2. a threshold circuit suitable for comparing the voltage at the terminals with a reference voltage, the output of the said threshold circuit being connected to a first input of the said control circuit,
    3. second means sensitive to the discharge current of the coil in the said storing element for maintaining the blocking of the said transistor, said second means comprising a third winding magnetically coupled with the primary and secondary windings of the coil, said third winding being connected to a second input of the said control circuit,
    4. the said control circuit being adapted for controlling the conducting of the said transistor when the said first and second means are inoperative, characterized in that it comprises, moreover, third means sensitive to the charging voltage of the said storing element and connected to the said threshold circuit for controlling the blocking of the said transistor when the intensity of the charging current exceeds a second determined threshold lower than the said first threshold, said third means acting when the charging voltage of the storing element exceeds another predetermined voltage lower than the said predetermined voltage.

* * * * *